United States Patent [19]

Van Gompel et al.

[11] Patent Number: 4,756,651
[45] Date of Patent: Jul. 12, 1988

[54] CARGO RESTRAINING DEVICE FOR PALLETIZED LOADS

[75] Inventors: James J. Van Gompel, Fremont, Ind.; Ronald R. Akey, Footville, Wis.

[73] Assignee: NP Marketing Corporation, Neenah, Wis.

[21] Appl. No.: 13,197

[22] Filed: Feb. 9, 1987

Related U.S. Application Data

[63] Continuation of Ser. No. 898,757, Aug. 13, 1986, abandoned, which is a continuation of Ser. No. 640,338, Aug. 13, 1984, abandoned, which is a continuation-in-part of Ser. No. 370,131, Apr. 20, 1982, Pat. No. 4,515,506.

[51] Int. Cl.⁴ .............................. B60P 1/64; B60P 7/13
[52] U.S. Cl. ......................................... 410/46; 410/52; 410/121; 108/55.3
[58] Field of Search ............. 410/46, 56, 66, 77, 410/83, 94, 120, 31, 32, 52, 34, 35, 38, 78, 121, 155; 108/51.1, 55.1, 55.3; 188/5, 7; 280/43.12

[56] References Cited

U.S. PATENT DOCUMENTS

| | | | |
|---|---|---|---|
| 1,142,088 | 6/1915 | Greene | 108/55.1 X |
| 1,559,827 | 11/1925 | Wittman | 410/94 X |
| 1,638,612 | 8/1927 | Baus | 410/120 |
| 2,420,640 | 5/1947 | Acteson | 108/55.1 X |
| 2,781,927 | 2/1957 | Holopainen | 188/7 X |
| 2,886,139 | 5/1959 | Wilson | 188/5 |
| 3,290,051 | 12/1966 | O'Brien | 280/43.12 |
| 3,307,658 | 3/1967 | Stevenson | 188/5 |
| 3,685,460 | 9/1972 | Steele, Jr. et al. | 108/51.1 |
| 4,013,020 | 3/1977 | Schoeller et al. | 108/51.1 |
| 4,147,112 | 4/1979 | Green et al. | 410/94 |
| 4,317,645 | 3/1982 | Van Gompel | 410/94 |

Primary Examiner—Robert B. Reeves
Assistant Examiner—Scott H. Werny
Attorney, Agent, or Firm—Stefan J. Klauber

[57] ABSTRACT

A cargo restraining device for a palletized load including a platform with a pallet crosstie reception slot for receiving a pallet with a load of cargo thereon, and a vertical frame at one end of the platform. A handle is pivotally secured to the frame and connected to a horizontally extending member which is movable to place it in frictional contact with a floor or supporting surface. To lock the pallet and platform to the floor, the handle is pushed downwardly while at the same time pushing the vertical frame toward the load. Movement of the handle which pivots about a hinge pivotally connected to the frame, moves the horizontally-extending member into contact with the supporting surface and at the same time lifts and tilts the platform, which adds an augmented downward force on the horizontally-extending member in contact with the supporting surface.

3 Claims, 4 Drawing Sheets

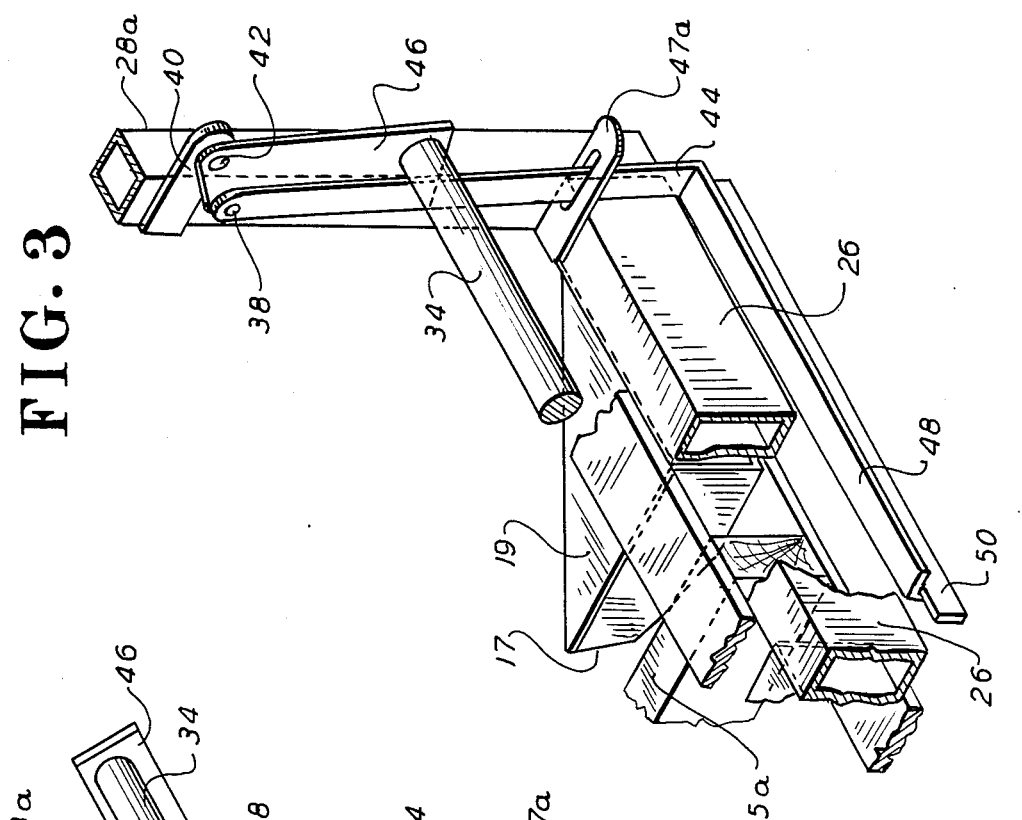
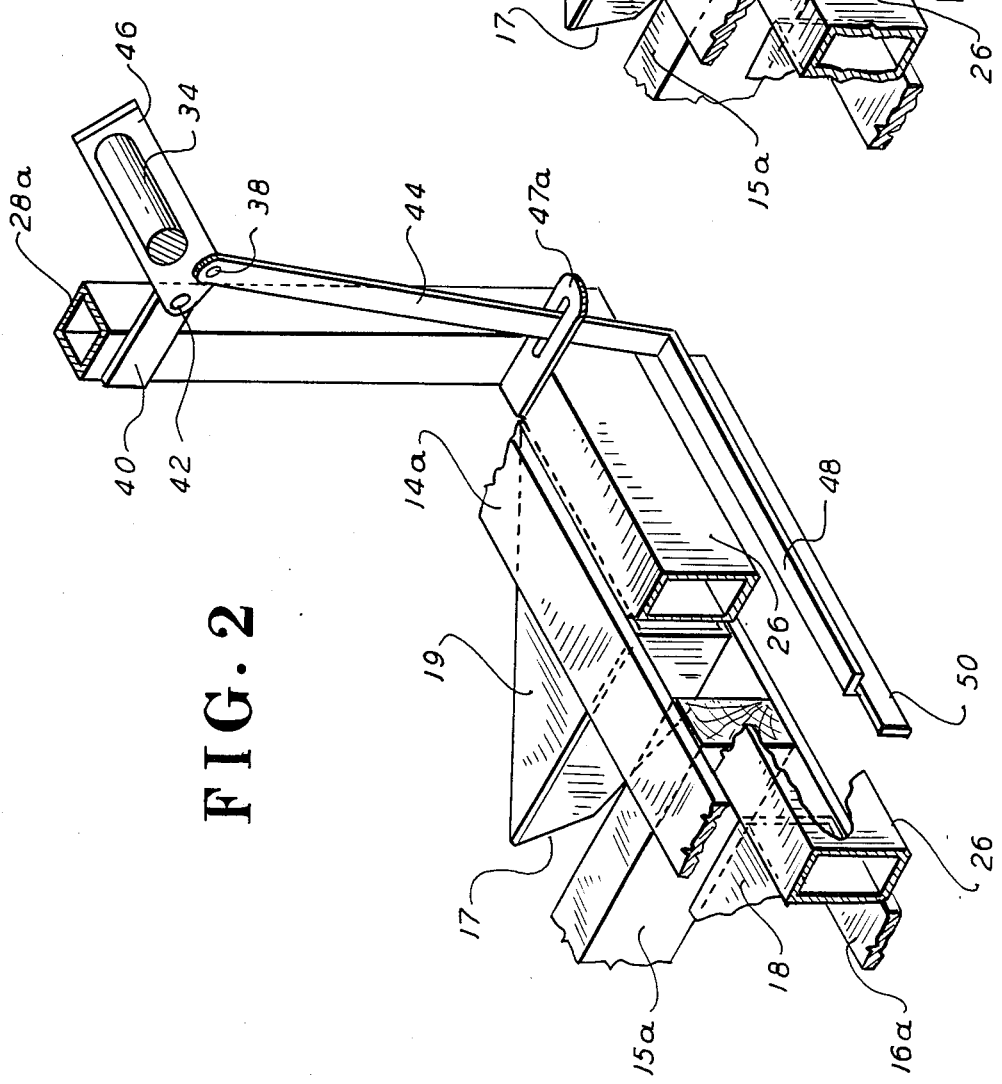

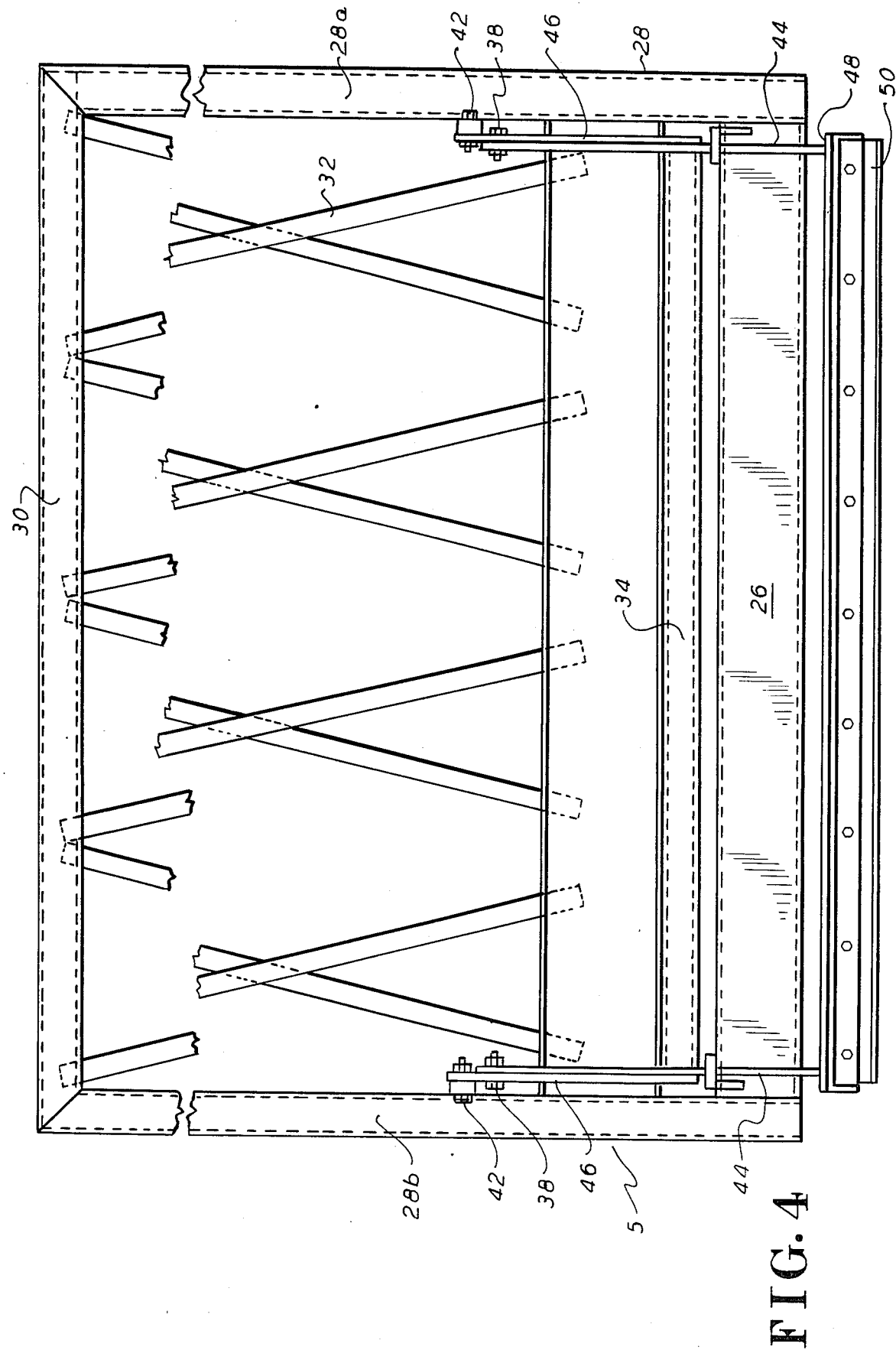

CARGO RESTRAINING DEVICE FOR PALLETIZED LOADS

This application is a continuation of application Ser. No. 898,757, filed on Aug. 13, 1986 and now abandoned, which is a continuation of application Ser. No. 640,338, filed on Aug. 13, 1984, also abandoned, which is a continuation-in-part of application Ser. No. 370,131 filed on Apr. 20, 1982 and now U.S. Pat. No. 4,515,506.

TECHNICAL FIELD

This invention relates to a cargo restraining device and in particular to a device having a platform for receiving a pallet loaded with cargo and restraining the pallet against movement when placed in a carrier.

BACKGROUND ART

Unless a cargo load is adequately secured within its vehicular carrier, motion of the vehicle, especially including acceleration and deceleration of same, tends to move or shift the cargo with consequent damage to same, and often as well, damage to the carrier. Heretofore, shippers have generally found it necessary to rely on banding, blocking, or bracing to secure the cargo load and provide for its integrity. Such practices, however, are not only time-consuming to install and costly, but also rely heavily on individual judgment for their adequacy.

U.S. Pat. No. 4,147,112, issued to Greene et al, relates to a cargo support or retainer which endeavors to avoid banding, blocking, or bracing of palletized cargo loads, by providing a substantially L-shaped frame, wherein the lower horizontal member which contacts the floor is provided with a plurality of "antiskid" spikes. This device while reasonably effective, has yet been found less than ideal for maintaining load integrity under a number of conditions, including when used in truck trailers mounted for piggy-back service on railroad cars. Moreover, the spikes cannot be used on the metal floors which are found e.g. in refrigerated trucks and railroad cars; and further, it is found that the mere substitution of rubber pads for the spikes does not solve this problem.

A further cargo restraining device is disclosed in U.S. Pat. No. 4,317,645 issued to the co-inventor herein, James Van Gompel. In this device, an elongated floor contacting member is provided with an upwardly facing load-bearing surface, the member being adapted to project forwardly beneath a portion of the cargo load. A generally upright member is secured to the floor contacting member in spaced relation from the forward end of the floor contacting member for engaging with the cargo load, and a floor piercing element is movably mounted on the floor contacting member adjacent to the rearward end thereof. The floor piercing element is normally disposed to pierce the floor when the floor contacting member of the restraining device is under load in service, and is movable to a position incapable of piercing the floor when the restraining device is out of service. This device is generally not of value with the aforementioned metal floored cars and truck vehicles, as the floor piercing elements either cannot engage the metal surfaces or simply damage same.

U.S. Pat. No. 1,559,827 issued to Whittman, relates to a freight anti-creeping device including a platform having spikes in its underside for gripping the floor, and a projecting lug on its upper face to which the cargo is wired. This projecting lug requires an opening in the cargo, or else the cargo must be mounted around the lug.

U.S. Pat. No. 1,638,612 to Baus, relates to a device for shipping boxes, which includes anti-skid plates between the boxes and the floor and clamp bars over the boxes, which are drawn to the floor by rods anchored adjacent the floor, blocks being secured to the boxes for preventing movement between the clamp bars and the boxes.

U.S. Pat. No. 2,420,640 to Acteson relates to a demountable pallet crib having frame members which enclose the perimeter of the pallet and form an open-work frame to enclose the cargo.

Since modern cargo is often palletized, i.e. placed on a pallet or plate which is conveniently carried by a fork-lift truck and placed on a carrier, it is desirable to reduce the labor required to place the pallet on the floor of the carrier and fix it in position. Thus, banding, blocking, or bracing should be eliminated. Yet, the pallet with its cargo should be restrained from movement while being transported in the carrier—and such a result must also be achieved on the metal floor commonly provided e.g. in a refrigerated truck or railway car.

In accordance with the foregoing, it may be regarded as an object of the present invention, to provide a device useful in securing a palletized load within a vehicular carrier against movement such as creeping, shifting, and the like.

It is another object of the invention to simplify the securing of a palletized load in a carrier.

It is still a further object of the invention, to provide a device for securing a palletized load in a carrier, which is simple to use both when fixing a palletized load in position, and when releasing the palletized load when it reaches its destination.

It is yet another object of the invention, to provide a device for securing and releasing a palletized load in a carrier, which requires very little effort to operate.

Still another object of the invention is to provide a device for securing and releasing a palletized load in a carrier, which is simple to construct and easy to operate.

A yet further object of the invention is to provide a device for securing and releasing a palletized load in a carrier of the type intended to refrigerate a load, which carrier is provided with a metal floor with ribs or spaced longitudinally-extending channels which allow cold air to circulate around the cargo.

SUMMARY OF THE INVENTION

Now in accordance with the present invention, the foregoing objects and others, as will become apparent in the course of the ensuing specification, are achieved by providing a cargo restraining device for a palletized cargo load, which includes a horizontal bifurcated platform for receiving the pallet with the cargo load thereon, and a vertical frame at one end of the platform, against which the cargo can abut. A handle is pivotally secured by a double pivot to the frame and to a vertically-extending assembly, the lower end of which is adapted to frictionally engage the floor of the carrier. Displacement of the handle means by an operator functions to move the said lower end of the vertically-extending assembly into contact with the floor, while at the same time exerting an upward jacking force on the adjacent end of the cargo supporting platform. This slight tilting or jacking of the platform increases the downward force on the vertically-extending member, aiding it to grip the floor.

When the pallet is interengaged with the platform, it can be locked in place by the weight of the cargo load on the pallet or by a serrated member which engages a cross-tie or runner of the pallet as disclosed in copending application Ser. No. 370,131, filed Apr. 20, 1982.

To lock the pallet to the floor after it is interengaged with the platform, the handle is pushed downwardly, which pushes the vertically-extending assembly away from the vertical frame and horizontal platform, and toward the floor—i.e. the lower end of the assembly moves below the plane of the pallet. This in turn tends to lift one edge of the pallet in jack-like fashion, adding the weight of the cargo to the downward force on the vertically-extending assembly. Continued movement of the handle locks the vertically-extending member in its extended position restraining the pallet against movement. Since the pallet is also frictionally secured to the platform by its own weight, the cargo is securely held in place.

The invention will be described in connection with the accompanying drawings, showing a preferred embodiment. However, it is apparent that modifications therein may be made without departing from the invention, which is defined in the appended claims.

BRIEF DESCRIPTION OF THE DRAWINGS

In the drawings:

FIG. 2 is a partial perspective view of the cargo restraining device released from the floor of a carrier.

FIG. 3 is a partial perspective view of the cargo restraining device secured to the floor of the carrier;

FIG. 4 is an end elevational view from the vertical frame end of the cargo restraining device in a mode where it is clamped on the floor of the carrier;

DESCRIPTION OF THE PREFERRED EMBODIMENT

Figure 1:
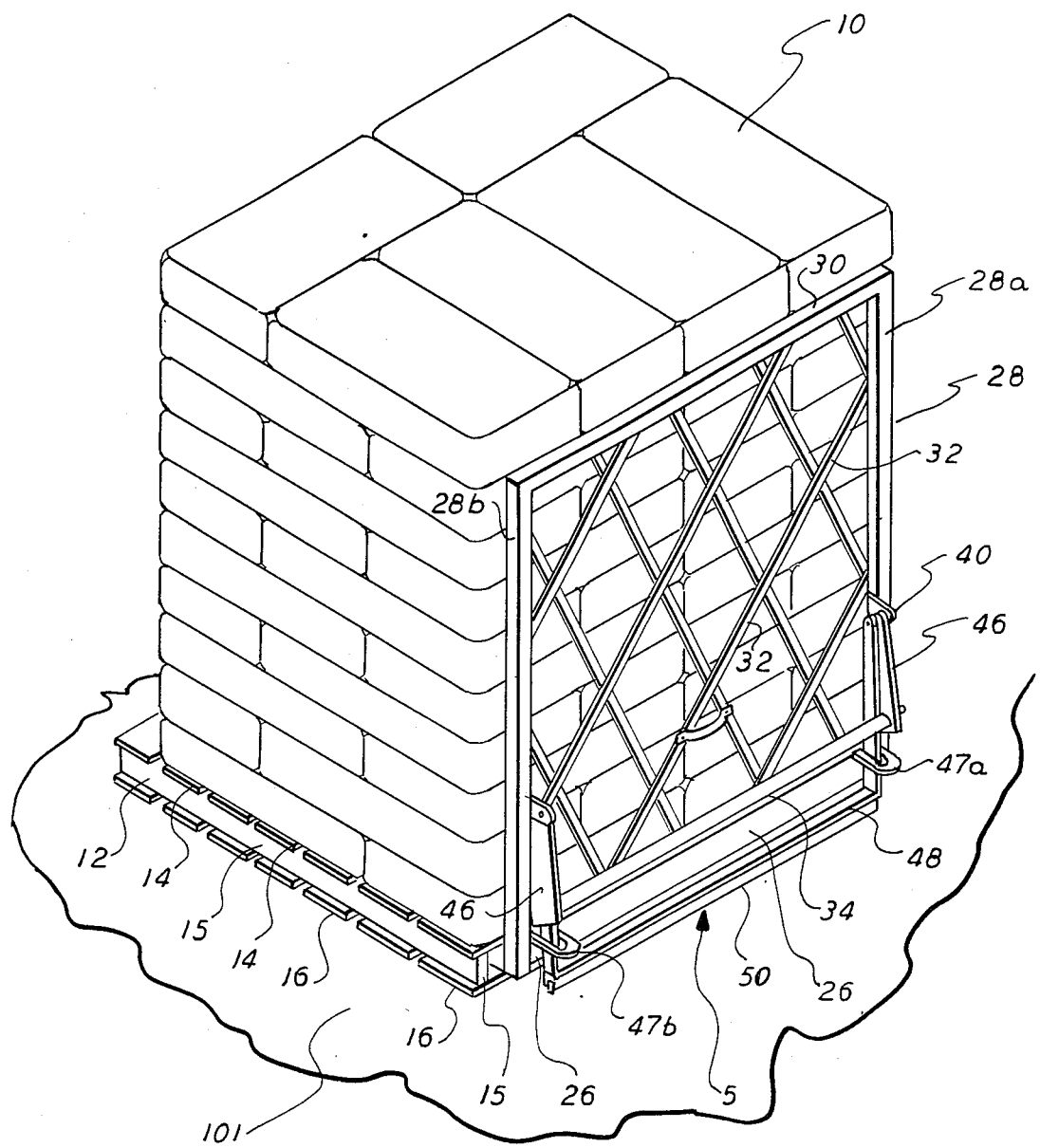
FIG. 1 is a perspective view showing a palletized cargo load a cargo restraining device according to the invention.

Referring to FIG. 1, a palletized load 10 is shown, supported on a conventional pallet 12, the load and pallet being associated with a cargo-restraining device 5 in accordance with the present invention.

For purposes of the present discussion, load 10 can be illustratively regarded as being of a type requiring refrigeration in shipment. Usually, therefore, such loads are shipped in refrigerator truck bodies or refrigerated railway cars. The floors of these carriers commonly comprise steel or the like, and channels or troughs often extend lengthwise in the carrier floors enable refrigerated air to be circulated for load cooling.

Pallet 12 generally comprises an upper supporting surface 14 comprising a plurality of wooden planks, and a lower surface 16 comprised of similar planks, with the upper and lower surfaces being separated by crossties 15, one of which 15a (FIGS. 2 and 3), is at approximately the center of the pallet.

Figure 6:
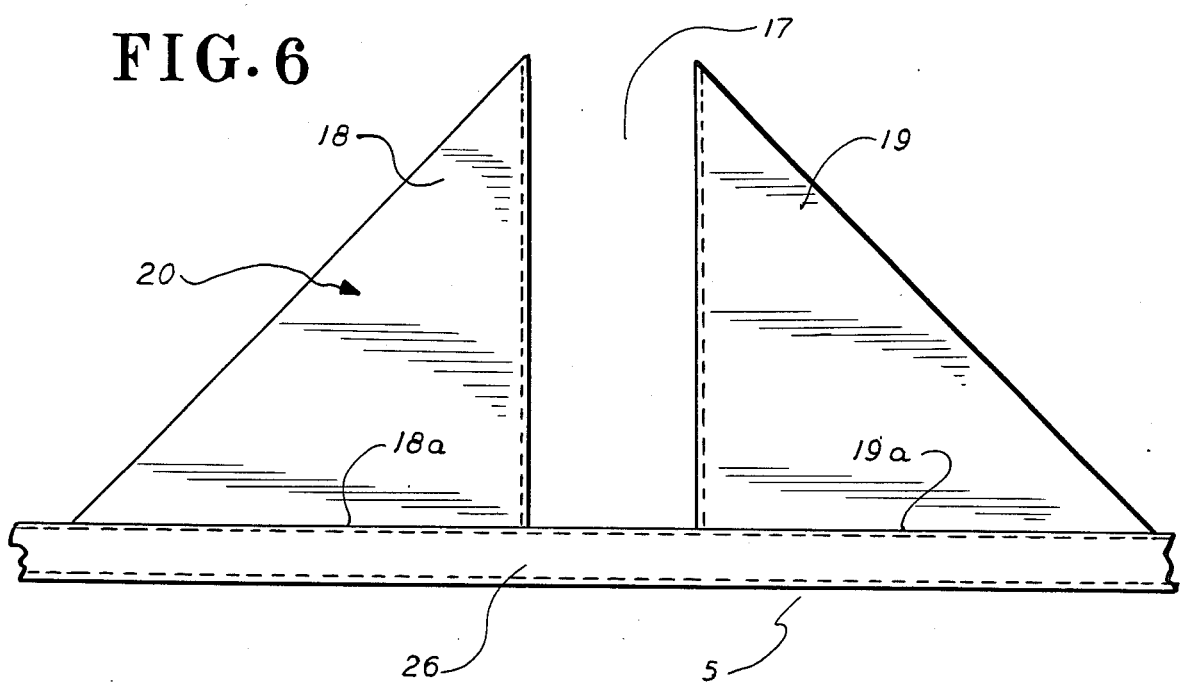
FIG. 6 is a partial plan view of the platform portion of the cargo restraining device according to the invention.
Figure 5:
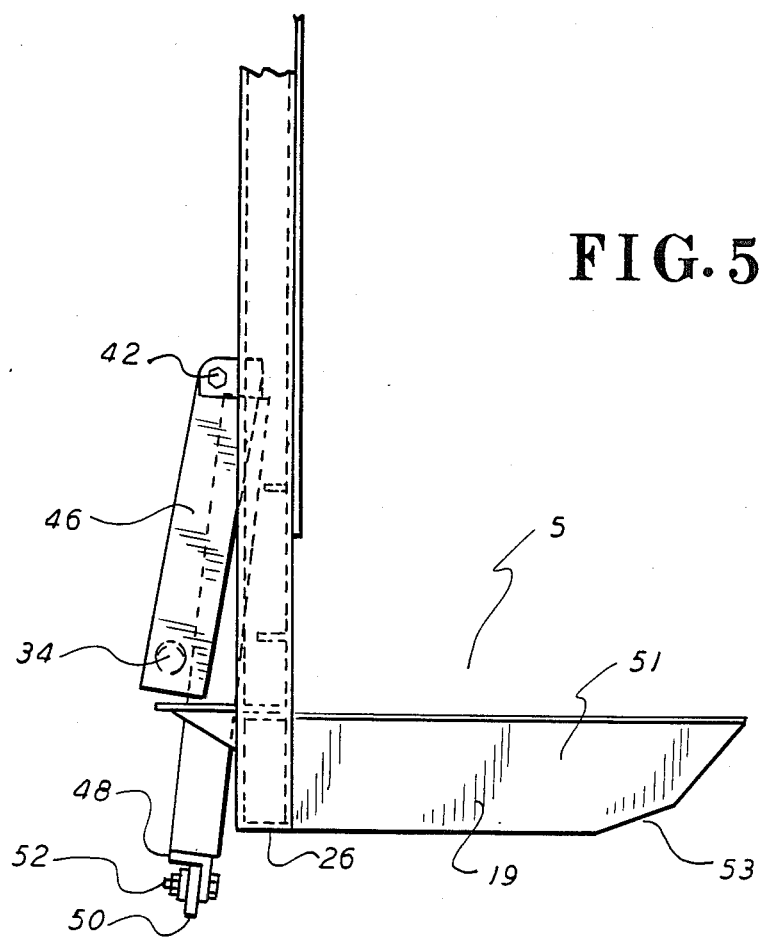
FIG. 5 is a side elevation view of the cargo restraining device in the mode where it is secured to the floor of the carrier.

Pursuant to the invention, cross-tie 15a is received into into a slot 17 between two generally triangular-shaped plates 18, 19, (FIGS. 2, 3 and 6), which comprise the horizontal portion of the generally L-shaped device 5 (FIG. 5), and which thus form a bifurcated platform 20 for interengagement with the loaded pallet. This insertion of the platform into the space between surfaces 14 and 16 of the pallet 12 is facilitated by the narrowing of the distal end of platform 20 achieved by convergence of the hypotenuses of the triangular plates 18 and 19. As seen in FIG. 5, the side walls 51 of plates 18 and 19 which abound slot 17 are bevelled at 53 toward their rear—to further facilitate insertion of the platform 20 into the space between the top 14 and bottom 16 of the pallet.

The base ends 18a and 19a (FIG. 6) of each triangular-shaped plate 18 and 19 are secured to a lower horizontal beam 26 of a generally rectangular vertical frame 28 (FIGS. 1 and 4), having upright legs 28a and 28b, and an upper cross-beam 30. The upper 30 and lower 26 cross-beams and upright legs 28a and 28b of the vertical frame 28 are braced by diagonally extending members 32.

A handle 34 is secured at each end to a hinge 46 by a pin 38 which is pivotally secured to a plate 40 connected to the vertical legs 28a and 28b of the frame, by a pin 42. Hinge 46 is also connected to members 44 by pins 38. This in effect forms a double pivot for the handle 34. Handle 34 is thus connected at each end, through hinge 46 and pins 38 and 42 to a generally vertically-extending assembly which includes members 44. The lower ends of members 44 are surrounded by bumper guards 47a and 47b, and are connected to a cross-bar 48 carrying on its underside a horizontally extending member 50 secured to the cross-bar by a bolt 52 (FIG. 5).

With the handle 34 in the upper position (FIG. 2), cross-bar 48, and in particular member 50, is above the plane of the bottom of the pallet, and is thus above the floor of a carrier or supporting surface. Upon handle 34 being moved to the lowered position (FIGS. 1 and 3) however, member 50 first contacts the underlying carrier floor 101 or other supporting surface and thus is extended below the pallet and to a position laterally displaced to one side of the frame 28, to prevent movement of the device 5 with the load thereon. Preferably, horizontally extending member 50 comprises, or is covered with a highly frictional material such as rubber, in order to obtain a greater frictional force from its contact with the floor.

With a cargo load on the pallet, and the pallet interengaged with the triangular-shaped plates 18, 19, movement of handle 34 thus results in movement of the upper ends of vertically extending members 44 inwardly toward the frame 28, which angles the lower ends of members 44 together with member 50 outward or away from frame 28, and the horizontally extending member 50 into contact with the floor 101 of the vehicle carrier. Also because of the double pivot, when horizontal member 50 reaches the vehicular carrier floor 101, the frame 28 is moved rearwardly with respect of member 50. The triangular shaped members 18 and 19 which support the pallet 12 are raised vertically with respect to member 50, tilting rearwardly the pallet and load. This results in an additional downward force from the cargo upon horizontal member 50; and the weight of the cargo load is brought to bear on platform 20 whereby the friction therebetween prevents movement of the pallet with respect to the platform. Further, the doublepivoting action of handle 34 results in locking of same (and of member 50) in the downward position, whereby the restraining device 5 effectively locks the pallet and load to the floor of the carrier until the handle 34 is later raised to the position of FIG. 2.

Operation of Device

When a palletized cargo load 10 is brought into a carrier by a fork-lift truck it is engaged by the cargo restraining device 5 with a cross-tie 15a being received between the triangular-shaped plates 18 and 19 so that it slides in slot 17.

Thereafter, handle 34 is grasped and displaced downwardly while pushing against frame 28, which will result in horizontal member 50 contacting the vehicular carrier floor 101 and then slightly tilting the load as previously discussed, to restrain movement of the device 5. Frictional contact of the horizontal member 50 with the vehicle carrier floor is increased by the weight of the load on the pallet which has tilted rearwardly, placing further force on the horizontal member 50. The weight of the cargo load on the upper supporting surface 14 will firmly hold the pallet in place.

Thus, the palletized cargo is firmly secured and prevented from moving while it is being transported. Upon reaching its destination, to release the pallet with its cargo load, the handle 34 is returned to its upper position which lifts the horizontal member 50 off the carrier floor. The pallet can now be released from the restraining device and the latter removed.

While the present invention has been especially illustrated in terms of specific embodiments thereof, it will be understood in view of the instant disclosure that numerous variations upon the invention are now enabled to those skilled in the art, which variations yet reside within the scope of the present teaching. Thus, for example, while the particular linkage arrangement utilized with handle 34, results in downward displacement of member 50 when the handle is moved downwardly, linkage arrangements are possible which could achieve this same result with upward movement of the said handle. Accordingly, the invention is to be broadly construed, and limited only by the scope and spirit of the claims now appended hereto.

We claim:

1. A cargo restraining device for restraining movement of a palletized cargo load on an underlying support floor of a vehicular carrier; said device being wheel-free and comprising:
   (a) a bifurcated horizontal platform for interengaging with a pallet with a cargo load upon said pallet, said pallet having a bottom and being of the type including an upper load supporting surface and wherein said bottom is separated from the upper surface by cross-ties; said bifurcated platform being adapted for insertion between said upper surface and said platform bottom, and defining a slot for reception of a cross-tie of said pallet with the adjacent portions of said platform adjacent the sides of said cross-tie;
   (b) a substantially vertical frame extending upwardly from one end of said platform;
   (c) a horizontally-extending frictional member having a bottom portion, said member being pivotally connected to said frame and movable at the side of said frame which faces away from said platform, between a withdrawn position whereat the said bottom of said member resides above the bottom of said pallet received on said platform, and an extended position whereat the bottom of said frictional member extends downwardly beyond the bottom of said pallet and is displaced laterally away from said vertical frame and platform, the engagement of said member with said underlying support floor thereby effecting vertical tipping of said device away from a zone of engagement of said member with said floor, to thereby generate an increased contact force between the underlying support floor and the said horizontal frictional member, thereby restraining lateral relative movement between said pallet-carrying device and said floor; said tipping generating increased frictional contact between said horizontal platform and the said pallet in which it is received, to prevent movement of said pallet with respect to said platform; and
   (d) handle means movable between first and second positions, for moving said horizontally-extending frictional member between said withdrawn and extended positions, said handle means being connected to said frame and said horizontally-extending member by a double pivot which locks said horizontally-extending member in its extended position when said handle means is at said second position said horizontallyextending member comprising a high-friction material at at least the part of said bottom portion thereof which contacts the underlying support floor.

2. A cargo restraining wheel-free device comprising:
   (a) A bifurcated platform for interengagement with a pallet with a cargo load upon said pallet, said pallet being of the type including an upper surface, a lower surface, and intervening cross-ties, said platform having two horizontal portions separated by a slot therebetween for receiving a cross-tie of the pallet upon insertion of said platform into the space between said upper and lower surfaces of said pallet with said portions adjacent the sides of said cross-tie;
   (b) a vertical frame extending upwardly from one end of the platform; and
   (c) a handle and hinge means at one side of the platform pivotally securing the handle to said frame at a pivot, said vertically-extending member being connected to a horizontal friction member adapted to extend downwardly beyond the bottom of said pallet when said handle is moved downwardly and; said second pivot being displaced past its vertically aligned lowermost point of rotation with respect to said first pivot and toward said vertical frame when said handle is moved downwardly, said vertically-extending members being thereby angled with their lower ends further away from said vertical frame and platform than their upper ends, thereby locking said handle in said downward position; said horizontal friction member in its said extended position acting by contacting an underlying supporting surface to tip said frame to effect frictional contact between said platform and upper support surface to prevent movement of said pallet with respect to said platform, and restrain movement of said device with respect to the underlying support by the resulting increase in frictional contact between said horizontal friction member and said support surface, at least the lower face of said horizontal member comprising a frictional material which is placed in contact with said underlying supporting surface.

3. A device in accordance with claim 2, wherein the horizontal portions comprising said platforms are each right triangles with the respective hypotenuses converging toward the distal end of said platform to define said slot and facilitate receipt of said platform by said pallet.

* * * * *

REEXAMINATION CERTIFICATE (2779th)

United States Patent [19]

Van Gompel et al.

[11] B1 4,756,651
[45] Certificate Issued * Jan. 23, 1996

[54] CARGO RESTRAINING DEVICE FOR PALLETIZED LOADS

[75] Inventors: James J. Van Gompel, Fremont, Ind.; Ronald R. Akey, Footville, Wis.

[73] Assignees: Bruce P. Purdy; Barabara G. Purdy, both of Incline Village, Nev.

Reexamination Request:
No. 90/003,742, Feb. 24, 1995

Reexamination Certificate for:
Patent No.: 4,756,651
Issued: Jul. 12, 1988
Appl. No.: 13,197
Filed: Feb. 9, 1987

[*] Notice: The portion of the term of this patent subsequent to May 7, 2002, has been disclaimed.

Related U.S. Application Data

[63] Continuation of Ser. No. 898,757, Aug. 13, 1986, abandoned, which is a continuation of Ser. No. 640,338, Aug. 13, 1984, abandoned, which is a continuation-in-part of Ser. No. 370,131, Apr. 20, 1982, Pat. No. 4,515,506.

[51] Int. Cl.[6] .............................. B60P 1/64; B60P 7/13
[52] U.S. Cl. .......................... 410/46; 410/52; 410/121; 108/55.3

[56] References Cited

U.S. PATENT DOCUMENTS

| | | | |
|---|---|---|---|
| 2,236,281 | 3/1941 | Anderson | 188/5 |
| 2,537,909 | 1/1951 | Puddester | 155/30 |
| 2,899,010 | 8/1959 | Ledgerwood | 182/118 |
| 3,164,261 | 1/1965 | Larson | 212/145 |
| 3,307,658 | 3/1967 | Stevenson | 188/5 |
| 4,515,506 | 5/1985 | Van Gompel et al. | 410/46 |

OTHER PUBLICATIONS

Artobolevsky, "Mechanisms In Modern Engineering Design", vols. I and II, Lever Mechanisms, pp. 5–17, and 562–567 (1975).

"Materials Handling Handbook", Edited by Bolz et al., 1958, pp. 41-21–23.

"Material Handling News", May 1977: Advertisements identified as Circle 61, 552 and 350.

*Primary Examiner*—Michael S. Huppert

[57] ABSTRACT

A cargo restraining device for a palletized load including a platform with a pallet crosstie reception slot for receiving a pallet with a load of cargo thereon, and a vertical frame at one end of the platform. A handle is pivotally secured to the frame and connected to a horizontally extending member which is movable to place it in frictional contact with a floor or supporting surface. To lock the pallet and platform to the floor, the handle is pushed downwardly while at the same time pushing the verical frame toward the load. Movement of the handle which pivots about a hinge pivotally connected to the frame, moves the horizontally-extending member into contact with the supporting surface and at the same time lifts and tilts the platform, which adds an augmented downward force on the horizontally-extending member in contact with the supporting surface.

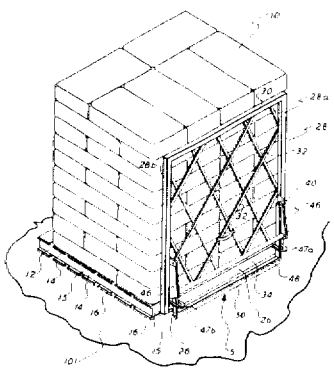

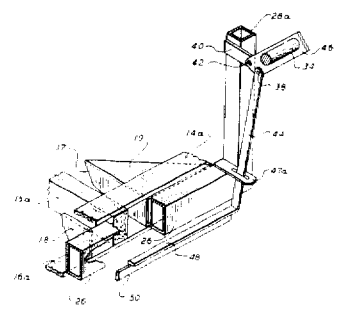

REEXAMINATION CERTIFICATE
ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *